UNITED STATES PATENT OFFICE.

CHARLES JENTY, OF PARIS, FRANCE.

IMPROVEMENT IN COMPOUNDS FOR GAS-FUEL.

Specification forming part of Letters Patent No. 160,201, dated February 23, 1875; application filed August 28, 1874.

*To all whom it may concern:*

Be it known that I, CHARLES JENTY, of Paris, France, president of the administrative council of "La société universelle de fabrication de produits propres à l'eclairage et au chauffage," have invented an Improved Compound for Gas-Fuel; and I do hereby declare that the following is a full, clear, and exact description of the same.

This invention relates to a new compound for the production of gas and for replacing the cannel-coal and bog-head used to enrich common coal-gas; and consists in combining peat with coal, lime, tar, and certain hydrocarbon, in the manner hereinafter more fully described.

It is first necessary to find some liquid hydrocarbon rich in hydrogen, and capable of being decomposed at the same degree of heat as naphthaline itself, in order that I may proceed by causing this mixture of hydrocarbon to be absorbed by a porous body which, on being decomposed, will itself yield protocarbureted hydrogen. To this end I proceed as follows:

I prepare a liquid carburet of hydrogen from heavy petroleum-oil or other hydrocarbon which will be decomposed at the same temperature as naphthaline. For this purpose I take crude naphthaline obtained from heavy gas-oils, and heat from 100° to 120° Fahrenheit, in order to liquefy the same, and I then add, according to the richness of the gas to be produced, from five to twenty or twenty-five per cent., by weight, of prepared petroleum-oil or other hydrocarbon decomposing at the same temperature as naphthaline.

The following are examples of the composition:

*First bath.*

| | |
|---|---|
| Naphthaline | 95 |
| Petroleum-oil | 5 |
| | 100 |

*Second bath.*

| | |
|---|---|
| Naphthaline | 90 |
| Petroleum-oil | 10 |
| | 100 |

*Third bath.*

| | |
|---|---|
| Naphthaline | 85 |
| Petroleum-oil | 15 |
| | 100 |

*Fourth bath.*

| | |
|---|---|
| Naphthaline | 80 |
| Petroleum-oil | 20 |
| | 100 |

*Fifth bath.*

| | |
|---|---|
| Naphthaline | 75 |
| Petroleum-oil | 25 |
| | 100 |

I immerse in one or other of these baths, heated to from 100° to 120° Fahrenheit, peat, or other dried and prepared porous body capable of yielding protocarbureted hydrogen. This porous substance is caused to imbibe from twelve to fourteen per cent. of the prepared naphthaline, which may be effected either by immersion, as above mentioned, or by injection under pressure. In this condition the peat or other product, carbureted as described, will yield in ordinary gas apparatus from thirteen thousand to fourteen thousand cubic feet of rich gas per ton, in addition to from five to six hundred weight of carbonized peat coke. The gas produced will possess an illuminating power of seven to twenty-four candles, according to the composition of the bath employed, supplied at the rate of twenty-three gallons per hour.

Peat carbureted as above described will give excellent results when used alone; but in order to obtain a product adapted for the production of gas, and to replace the cannel-coal and bog-head used to enrich common coal-gas, which produce little if any coke, I take peat carbureted in one of the baths hereinbefore mentioned, in the proportion of from sixty to seventy parts, by weight; good gas-coal, thirty to forty parts; and lime, one part. These proportions may, however, be varied. The matters are ground up together with ten to twelve per cent. of a mixture of coal and wood tar, and afterward compressed and molded into blocks of any suitable form.

One ton of this material will produce from fourteen thousand to fifteen thousand cubic feet of gas of eighteen to twenty candle power, with an expenditure of twenty-three gallons per hour, in addition to half a ton of vegeto-mineral coke, which, owing to its porosity and the nature of its composition, will form a perfect substitute for all kinds of domestic fuel.

I claim—

The combination of peat which has been carbureted by immersion in prepared naphthaline with coal, lime, and tar, in the proportions described, the tar serving to bind the other powdered ingredients, as specified.

CH. JENTY.

Witnesses:
  ROBT. M. HCOPER,
  EMILE DUHAN.